(12) United States Patent
Lohrberg et al.

(10) Patent No.: US 7,757,713 B2
(45) Date of Patent: Jul. 20, 2010

(54) HYDRAULIC VALVE

(75) Inventors: Henrik Lohrberg, Frankfurt (DE); Daniel J. Wolfe, Trafford, PA (US)

(73) Assignee: ABB Technology AG, Zurich (CH)

( * ) Notice: Subject to any disclaimer, the term of this patent is extended or adjusted under 35 U.S.C. 154(b) by 553 days.

(21) Appl. No.: 11/642,849

(22) Filed: Dec. 21, 2006

(65) Prior Publication Data
US 2007/0144596 A1  Jun. 28, 2007

(30) Foreign Application Priority Data
Dec. 23, 2005  (DE) .................. 10 2005 062 350

(51) Int. Cl.
*F16K 11/044* (2006.01)
(52) U.S. Cl. .................. 137/625.27; 251/122
(58) Field of Classification Search ............ 137/625.65, 137/625.69, 625.27; 251/120–122
See application file for complete search history.

(56) References Cited

U.S. PATENT DOCUMENTS

| 331,789 | A | * | 12/1885 | Harvey | 137/625.68 |
| 1,588,645 | A | * | 6/1926 | Barrett | 251/210 |
| 3,312,246 | A | * | 4/1967 | Tam | 137/625.69 |
| 3,538,954 | A | * | 11/1970 | Bowsher et al. | 137/625.65 |
| 3,794,075 | A | * | 2/1974 | Stoll et al. | 137/625.66 |
| 3,918,351 | A | * | 11/1975 | Finke | 91/418 |
| 4,026,325 | A | * | 5/1977 | Loveless | 137/625.26 |
| 4,144,514 | A | * | 3/1979 | Rinde et al. | 335/229 |
| 4,567,914 | A | * | 2/1986 | Coppola et al. | 137/625.64 |
| 4,641,686 | A | * | 2/1987 | Thompson | 137/625.65 |
| 5,103,866 | A | * | 4/1992 | Foster | 137/596.15 |

FOREIGN PATENT DOCUMENTS

| CH | 2 11 533 A | 9/1940 |
| DE | 1 550 203 A | 1/1970 |
| DE | 2 248 891 A | 5/1973 |

* cited by examiner

*Primary Examiner*—Stephen Hepperle
*Assistant Examiner*—Craig M Schneider
(74) *Attorney, Agent, or Firm*—Buchanan Ingersoll & Rooney PC

(57) ABSTRACT

Hydraulic valve having a valve body and housing, which has a first, second and third cutout. A hydraulic medium is fed via the first cutout. The hydraulic medium is fed to a pressure consumer via the second cutout and to a pressure sink via the third cutout. The valve body moves to and fro between two end positions. From a second end position, the hydraulic medium passes from the first to the second cutout. In a first end position, the hydraulic medium passes from the second to the third cutout. Owing to the valve body, a constant flow cross section for the hydraulic medium, released by the first cutout, arises during a switching operation from the first into the second end position in a fixed time span, resulting in a maximum flow cross section being achieved when the valve body is in the second end position.

9 Claims, 1 Drawing Sheet

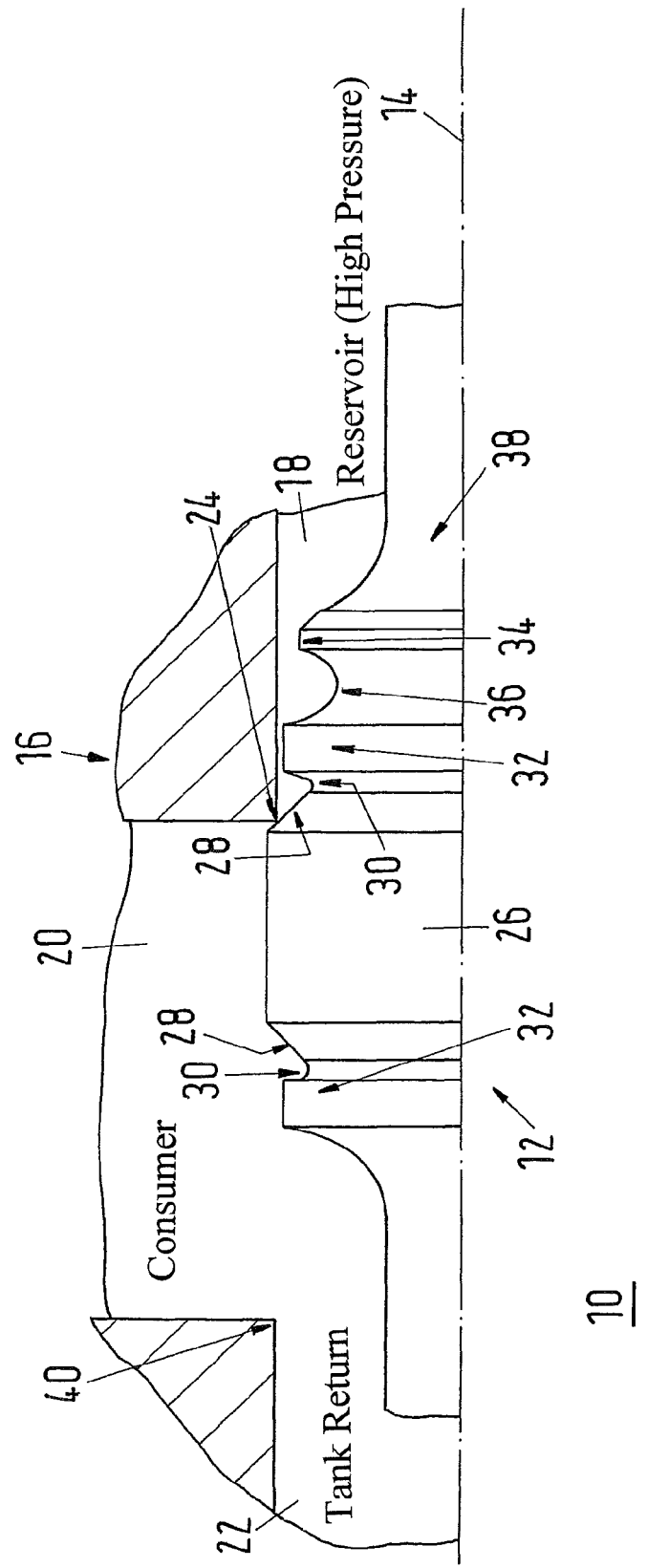

HYDRAULIC VALVE

BACKGROUND OF THE INVENTION

1) Field of the Invention

The invention relates to a hydraulic valve having a valve body in a valve housing, which has a first, a second and a third cutout. A hydraulic medium can be fed via the first cutout. In addition, the hydraulic medium can be fed to a pressure consumer via the second cutout and the hydraulic medium can be fed to a pressure sink via the third cutout. The valve body can move to and fro between two end positions, in which case, in the first end position, the hydraulic medium passes from the first to the second cutout, and, in the second end position, the hydraulic medium passes from the second to the third cutout.

2) Description of Related Art

Such hydraulic valves are generally known and are also referred to as changeover valves. In this case, the changeover takes place by the valve body moving to and fro, which takes place comparatively rapidly. This may result in undesirable pressure surges in the hydraulic system if the flow cross sections for the hydraulic medium are released comparatively rapidly by the valve body. Depending on the design of the hydraulic system, such pressure surges may cause oscillations in the overall system which are likewise undesirable.

It has been shown, for example, that, when using two-stage changeover valves in hydromechanical spring-energy store drives for high-voltage switchgear assemblies, the pressure surges in the hydraulic system may be so great that the drive and/or the switch are influenced thereby.

SUMMARY

On the basis of this prior art, the object of the invention is to specify a hydraulic valve with which the pressure surges in the hydraulic system owing to switching operations are reduced.

Accordingly, a hydraulic valve according to the invention is characterized by the fact that a constant flow cross section for the hydraulic medium through the first cutout is released by the valve body during a switching operation from the first into the second end position over a fixed time span, and that the flow cross section differs from the maximum flow cross section when the valve body is in the second end position.

The invention therefore provides that the valve does not continuously release the flow cross section when it is switched from the first into the second end position, but first partially releases the flow cross section, then maintains the released flow cross section for a fixed time span and only further enlarges the flow cross section after the fixed time span until the maximum flow cross section is reached. This prevents a pressure surge owing to the sudden release of the entire flow cross section, i.e. of the maximum flow cross section, causing correspondingly high pressure surges.

Advantageously, this can be achieved by the valve body being held permanently in an intermediate position between the two end positions over the fixed time span. For this purpose, in particular the drive of the hydraulic valve needs to be driven in a corresponding manner and, overall, the mechanics of the valve body need to be correspondingly adapted.

In one advantageous refinement of the hydraulic valve according to the invention, the abovementioned advantages are also achieved by the valve body, on its side pointing towards the first cutout, being matched in terms of its external design to the design of the first cutout, and by, in the event of a continuous movement of the valve body from the first into the second end position, the flow cross section being constant over the fixed time span.

This refinement advantageously achieves the situation in which the drive of the hydraulic changeover valve, which generally brings the valve body continuously from the first into the second end position, which can be used from that point on. This is because, according to the invention, the constant flow cross section over the fixed time span is achieved by a corresponding refinement of the valve body, i.e. in a corresponding mechanical refinement.

The advantages according to the invention can also be achieved if a gap between a surface of the valve body and a surface of the valve housing is regulated to define the flow path of the hydraulic medium in the region of the first cutout.

In this case, the gap which can be regulated, can define the flow path of the hydraulic medium, of the hydraulic valve.

Further advantageous refinements of the hydraulic valve according to the invention can be gleaned from the further dependent claims.

The invention, advantageous refinements and improvements of the invention and particular advantages thereof will be explained and described in more detail with reference to the exemplary embodiment illustrated in the drawing, in which:

BRIEF DESCRIPTION OF THE DRAWING

The FIGURE shows a sectional diagram through a hydraulic changeover valve as a sketch.

DETAILED DESCRIPTION

FIG. 1 shows a sectional diagram through a changeover valve 10, in the case of which a valve body 12 is shown, whose lower (in this illustration) half is not illustrated, which is represented by a line of symmetry 14 of the valve body 12. In this case, the valve body 12 can move to and fro in the direction of the axis of symmetry 14 in a valve housing 16.

The valve housing 16 has a first cutout 18, which, in the example illustrated, is in the form of a cylindrical hole and, in the FIGURE, is arranged on the right-hand side in the view shown. In this case, the first cutout 18 is connected to a pressure reservoir, in this case a high-pressure reservoir, which makes available a hydraulic oil given a specific pressure. This hydraulic oil is fed to the changeover valve 12 via the first cutout 18 through a high-pressure line (not illustrated).

In this case, the valve body 12 is illustrated in a position in which the first cutout 18 is completely closed, and which will be referred to as the first end position. Sealing between the valve body 12 and the valve housing 16 in this case takes place at a sealing seat 24, which is arranged at the point of the transition between the first cutout 18 and a second cutout 20 so as to seal the high-pressure side of the changeover valve 10. The second cutout 20 is in this case the cutout at the changeover valve 10 at which a pressure consumer, for example a control valve, can be connected.

Such a sealing seat is generally designed to be conical in the region of the first cutout, for example in the form of bevelling of the relevant edge at the valve housing 16, which is not illustrated in detail in this FIGURE, however. The sealing at this point takes place with respect to the valve body 12, which is in the form of a cylindrical central part 26 in its central region, and having a diameter which is greater than the diameter of the first cutout 18. This ensures that the sealing seat 24 acts as a stop edge for the central part 26. For this purpose, the latter is provided with a bevel 28 in each case in its axial edge regions, which bevel ends at an undercut 30 of an overlapping section 32.

The overlapping regions 32 in this case have a diameter which is only comparatively slightly smaller than the diameter of the first cutout 18 or of a third cutout 22 on that side of the valve housing 16 which is opposite the first cutout 18. In this case, the third cutout 22, in the present example, is connected to a tank return line, i.e. a pressure sink, which leads to a hydraulic oil tank, from which a pump feeds the high-pressure reservoir, if necessary. The overlaps 32 are provided in particular for guiding the valve body 12 into the regions of the first cutout 18 and of the third cutout 22. The remaining gaps between the cutouts 18, 22 and the overlaps 32 are so small that they can even be referred to as sealing gaps and therefore do not allow any quantities of oil through which are essential to the functioning of the valve.

On that side of the valve body 12 which points towards the first cutout 18, a run-in edge 34 is also arranged in the direction of the first cutout 18, which run-in edge on the one hand is connected to a further undercut 36 with the corresponding overlap 32 and, on the other hand, is in the form of a valve plunger 38, which is connected to the drive (not illustrated) of the valve body 12. The run-in edge 34 is only provided on this side of the valve body 12.

In order to be able to explain the operation in more detail, the procedures involving the changeover valve 10 will be outlined below, which, in the event of a switching operation from the first end position, as is illustrated in the FIGURE, into a second end position in which the valve body 12 is located on a second sealing seat 40. Owing to the valve drive, which exerts a force effect on the valve plunger 38, the valve body 12 will begin to move from right to left in this FIGURE, starting from its first end position, along the axis of symmetry 14. In a first phase, the valve body leaves its sealing seat 24, with the result that complete sealing of the high-pressure medium, which is present, under pressure, in the first cutout 18, is no longer ensured. Since the free flow cross section between the corresponding overlap 32 and the hollow diameter of the first cutout 18 only has a small area, however, the flow of hydraulic oil, which passes to the second cutout 20 or to the third cutout 22, is comparatively low, with the result that there is a pressure buildup in the region of the second cutout 20. As soon as the overlap 32 in question leaves the region of the first cutout 18, a substantially larger flow cross section becomes free for the hydraulic oil which is determined by the annular gap between the diameter of the run-in edge 34 and the hollow cylinder diameter of the first cutout 18. This free flow cross section can be determined according to the invention by the construction of the valve body 12. In addition, according to the invention, the time span in which this partially released flow annular gap effect unfolds is determined from the distance between the overlap 32 in question and the run-in edge 34. In conjunction with the known movement speed of the valve body 12 along the axis of symmetry 14, it is possible to determine, in a simple manner, how long the time span is. As soon as the run-in edge 34 leaves the axial region of the first cutout 18, the maximum flow cross section in accordance with the predetermined construction is achieved for the run-in of the high-pressure oil. In this case, the valve body 12 is moved until it has reached the second sealing seat 40 and therefore seals the flowing-in high-pressure oil off from the tank return, with the result that the hydraulic oil passes completely to the consumer, which is connected to the second cutout 20.

In the present example, it is therefore shown that, according to the invention, the hydraulic oil is supplied to the consumer, so to speak, in two pressure stages, with the result that the opening of the high-pressure line initially does not experience the entire pressure peak, as in the case of complete opening of a changeover valve, as is known in the prior art.

It is also within the concept of the invention if more than one run-in edge is provided which expediently each have a smaller diameter from stage to stage.

The invention claimed is:

1. Hydraulic valve, comprising:
a valve housing, which has a first, a second and a third cutout, it being possible for a hydraulic medium to be fed via the first cutout, it being possible for the hydraulic medium to be fed to a pressure consumer via the second cutout, it being possible for the hydraulic medium to be fed to a pressure sink via the third cutout; and
a valve body including,
a first end portion on a first cutout side and a second end portion on a third cutout side, the first end portion including a cylindrical run-in-edge narrower than the first cutout and an undercut narrower than the cylindrical run-in-edge,
first and second overlapping sections arranged between the first end portion and the second end portion and having a diameter smaller than the diameter of the first and third cutouts respectively for guiding the valve body into the respective cutouts, wherein the cylindrical run-in-edge is narrower than the first overlapping section and the undercut is arranged between the run-in-edge and the first overlapping portion, and
a cylindrical central part arranged between the first and second overlapping sections having a diameter greater than the first and third cutouts and including, at one end, a first sealing seat and at another end, a second sealing seat, the valve body being capable of moving to and fro between at least three positions, in which case from a second position, the hydraulic medium passes from the first to the second cutout, in a first position, the hydraulic medium passes from the second to the third cutout, and in an intermediate position between the second position and the first position, the hydraulic medium passes from the first cutout to the second cutout wherein a constant flow cross section for the hydraulic medium through the first cutout is released by the valve body during a switching operation from the second position into the intermediate position over a fixed time span, in that a maximum flow cross section is achieved when the valve body is switched from the intermediate position into the first position, and in that the constant flow cross section differs from the maximum flow cross section.

2. Hydraulic valve according to claim 1, wherein a gap between a surface of the valve body and a surface of the valve housing is regulated, to define the flow path of the hydraulic medium in the region of the first cutout.

3. Hydraulic valve according to claim 1, wherein the valve body is held in the intermediate position between the two positions over the fixed time span.

4. Hydraulic valve according to claim 3, wherein the valve body, on its side pointing towards the first cutout, is matched in terms of its external design to the design of the first cutout, and in that, in the event of a movement of the valve body from the first into the second end position, the flow cross section is constant over the fixed time span.

5. Hydraulic valve according to claim 1, wherein the valve body, on its side pointing towards the first cutout, is matched in terms of its external design to the design of the first cutout, and in that, in the event of a movement of the valve body from the first into the second end position, the flow cross section is constant over the fixed time span.

6. Hydraulic valve according to claim 5, wherein the movement is continuous.

7. Hydraulic valve according to claim 6, wherein the first cutout has a hollow-cylindrical design on the side pointing towards the valve body.

8. Hydraulic valve according to claim 5, wherein the first cutout has a hollow-cylindrical design on the side pointing towards the valve body.

9. Hydraulic valve according to claim 8, wherein the valve body, on its side pointing towards the first cutout, has an axial region which has an outer surface with a cylindrical design, and in that an annular gap is formed between the first cutout and the axial region.

* * * * *